Figure 1:
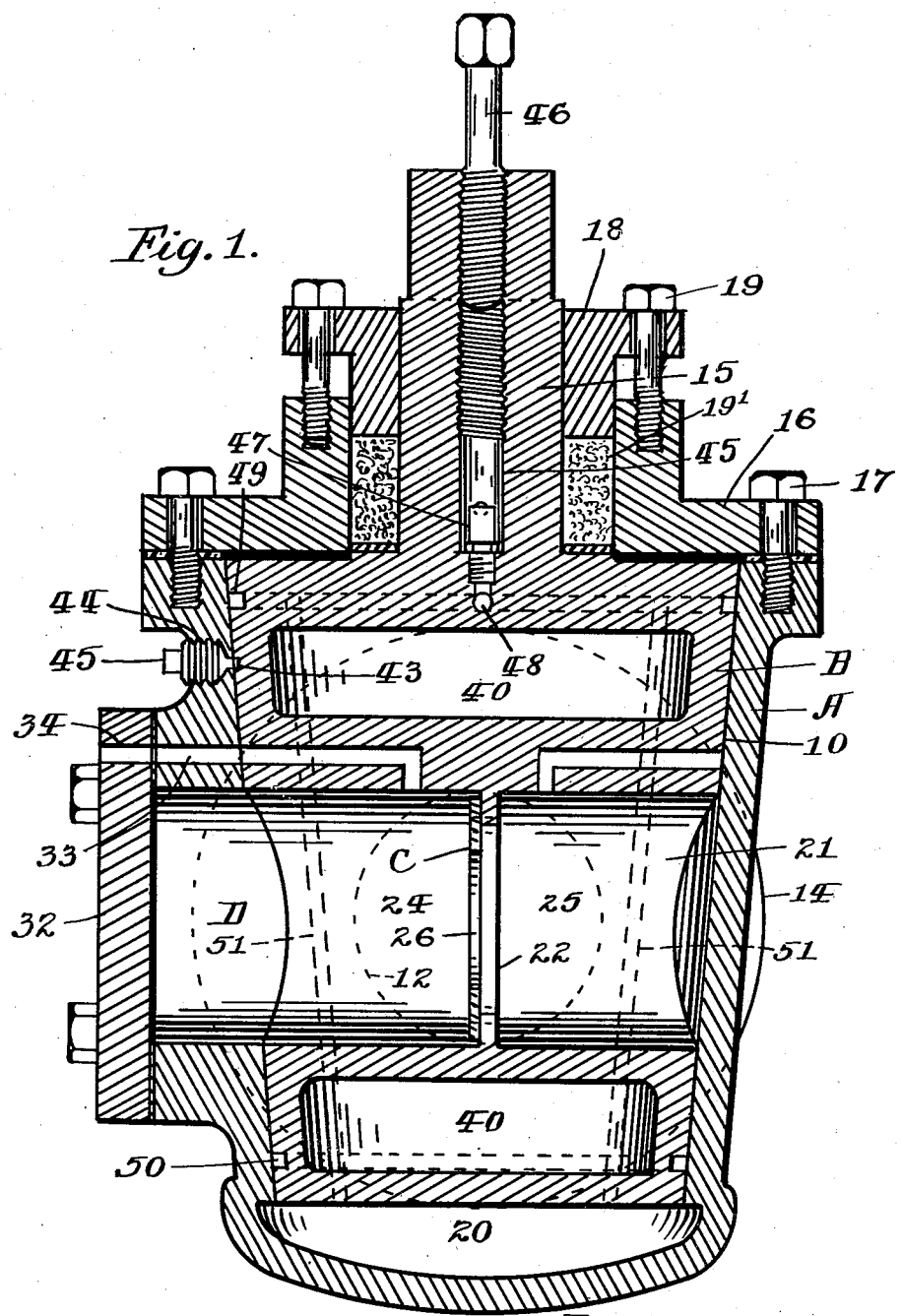

March 26, 1935.  P. H. WILKINSON  1,995,490
ORIFICE FITTING
Filed Nov. 23, 1931   2 Sheets-Sheet 1

Inventor:
Paul H. Wilkinson.
by: S. Bradbury.
Attorney.

March 26, 1935. P. H. WILKINSON 1,995,490
ORIFICE FITTING
Filed Nov. 23, 1931 2 Sheets-Sheet 2
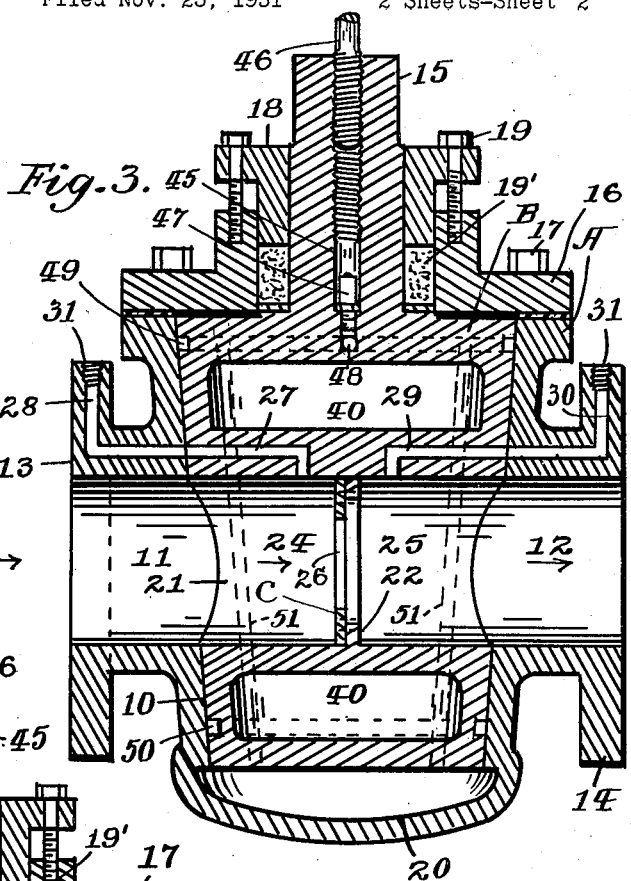
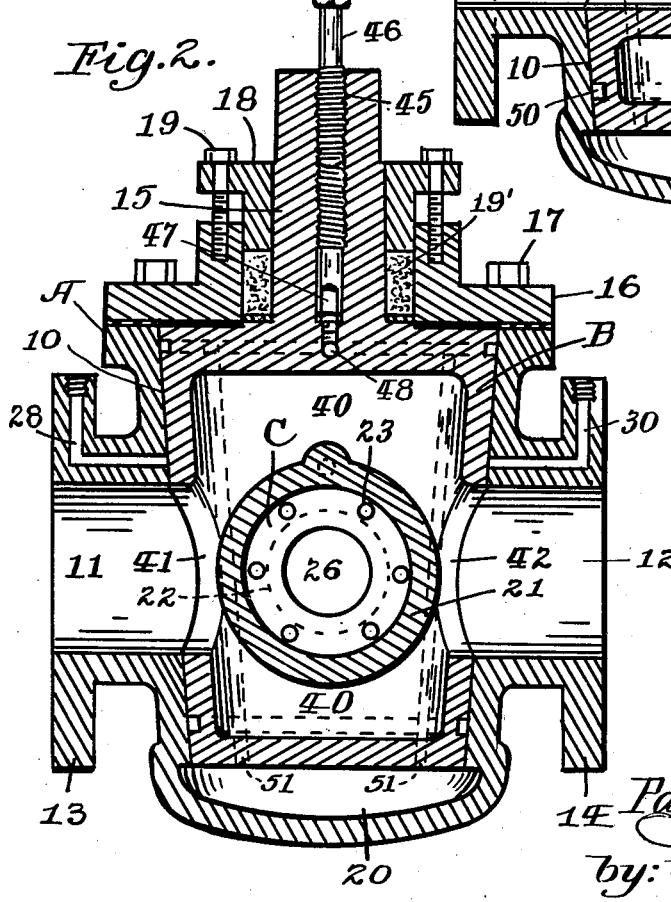
Inventor:
Paul H. Wilkinson,
by: [signature]
Attorney.

Patented Mar. 26, 1935

1,995,490

UNITED STATES PATENT OFFICE 1,995,490

ORIFICE FITTING

Paul H. Wilkinson, Huntington Park, Calif.

Application November 23, 1931, Serial No. 576,799

5 Claims. (Cl. 73—167)

My invention relates to improvements in orifice fittings of that type which is usually although not exclusively employed in pipe lines for maintaining a constant regulated flow of oil, gas or other fluid through the line. It has been customary in fittings of this type to employ orifice plates having a selected size or diameter of orifice which enables an orifice of a selected size to be permanently used in a fitting for gauging the flow of fluid permitted by the fitting. These orifice plates require inspection, cleaning, exchange or repairs from time to time due to the collection of sediment, sludge, etc., and when making such inspection, cleaning, exchange or repairs, it has been generally necessary to shut off the flow of fluid through the line or to use complicated and expensive equipment to maintain uninterrupted service. It is an object of this invention to provide a fitting which overcomes these objections in a simple and effective manner and by the use of simplified construction, thus saving time, labor and expense. Therefore, one of the principal objects of this invention is to enable an operator to remove the orifice plate from its support and thence from the plug and allow a substitute orifice plate of the same or different size to be replaced without shutting off the flow of fluid through the fitting and its connected pipe line. Among further objects is to provide means for lubricating the parts of an orifice fitting and of overcoming in an efficient and effective manner substantially all possibility of any of the working parts of the device sticking or requiring other than a wrench for operating the parts of the device. With these and other objects in view my invention comprises the features of construction and combination of parts hereinafter described and claimed.

In the accompanying drawings forming part of this specification, Fig. 1 is a vertical section of my improved fitting taken transversely of the line of piping in which the fitting may be used, what I have chosen to term the plug or core being turned into a position by-passing the flow of fluid around the orifice plate and said orifice plate facing the hand hole in the fitting in readiness for cleaning or exchange, as provided by my invention; Fig. 2 is a vertical section on a somewhat reduced scale of my improved orifice fitting taken longitudinally of the line of piping in which the fitting may be used, said plug being turned into a position in which the flow of fluid is by-passed around the orifice in the plug and said orifice in position facing the hand hole in the side of the fitting, and Fig. 3 is another vertical section of the fitting, taken longitudinally of the line of piping in which the fitting may be used, showing the plug in what I have chosen to term "normal" position, that is with the orifice plate intercepting the flow of fluid through the main duct or channel traversing the plug and body.

In the drawings, A indicates the body or casing of my improved fitting in which is a suitable chamber defining a plug seat 10 tapering downwardly and formed with a pair of aligned main line ports or ducts 11 and 12 extending laterally from the sides of said body and terminating in flange coupling elements 13 and 14 for attaching the body of the fitting to a pipe line for gauging the flow of fluid therethrough. Fitting tightly and adapted to turn about a vertical axis in said body upon the seat 10 is a downwardly tapering plug B, having an upwardly extending stem 15, to the upper extremity of which a wrench or other tool may be applied for turning the plug. A cover plate 16 secured by bolting at 17 or other suitable means on the body of the fitting serves to assist in holding the plug tightly upon its seat. Also a packing gland member 18, compressing by bolts 19, suitable packing 19' around the stem 15, holds the plug rotatably in the body and assists in producing a tight joint to prevent leaking around the plug in the body. The plug is preferably a ground fit upon its seat to also assist in preventing any leaking. The body of the fitting is formed with a closed lifting chamber 20 below the plug for receiving and holding grease or other lubricant under pressure in a manner as will be hereinafter described.

The plug has a transverse main duct 21, which corresponds in diameter with and is adapted in one position of the plug to register with the axially disposed main line ports or ducts 11 and 12 in the body to conduct the flow of fluid through the fitting preferably in the direction of the arrows shown in Fig. 3.

Preferably although not necessarily cast integral with the plug and substantially midway between the ends of the main duct 21 is an annulus 22, to the surface of which on the up stream side 24 thereof is secured by screws 23 or other suitable means, an orifice plate C of any suitable size and shape for gauging the flow of fluid through the fitting. As any fluid passes through the fitting in the direction shown by the arrows in Fig. 3, the pressure on the upstream side 24 is higher than the pressure on the down stream side 25 in exact proportion to the flow of fluid passing the orifice 26 in the orifice plate. The pressure on the upstream side may be led to a meter (not shown) through registering ducts 27 and 28 while the pressure on the down stream side may be led to a meter (not shown) through registering ducts 29 and 30. Said registration of these meter connections is effected when the main transverse duct 21 in the plug is in complete registration with the the main line ports 11 and 12 in the body A. Said meter ducts 28 and 30 lead through the flanges 13 and 14 respectively and terminate in internally threaded openings 31 for convenience in securing meter connections.

As one of the objects of the invention is to enable the operator to remove the orifice plate C from its supporting annulus and thence from the body A, and to allow a substitute orifice plate of the same or a different size to be placed on the annulus, without shutting off the flow of fluid through the orifice fitting, the orifice plate is made accessible through a hand hole D entering the side of the body A when the plug is turned 90 degrees from the original line so that the orifice plate faces across the line of flow toward a removable bolt secured plate 32 which normally closes and seals the hand hole. When the plug assumes this position, that is across the line of flow, the plug connects through rotation with the registering bleeder ducts 33 and 34, thereby releasing any pressure in the chamber connected with the hand hole through the continuous duct 33 and 34 to the atmosphere. The operator is now able to remove plate 32 and enter the space D to inspect, clean, remove or exchange the orifice plate C as desired or to clean and inspect duct 21.

The plug is formed with a bifurcated by-passage 40 around duct 21, terminating in port connecting openings 41 and 42, which are adapted to register respectively with the main line ports or ducts 11 and 12 when the plug is turned 90 degrees from the original line so that the orifice plate faces across the line of flow. The fluid under this condition continues to pass through the plug and the flow through the main line is uninterrupted while the operator has free access to the orifice plate through the hand hole D. It will be noted that the ports 11 and 12, in the wall of the body or casing A and transverse main duct 21, through the plug are of even diameter and have solid walls containing no other ports or ducts (excepting the meter take off ducts 27 to 30 inclusive) and that the edges of said ports 11 and 12 and duct 21 coincide, leaving no cavities which might destroy continuity of the flow of the fluid both before and behind the orifice plate 26. There must be a perfectly smooth round bore before and behind the orifice plate throughout the entire length of the fitting. These features are highly important with the use of orifice meters or differential gauges because any counter currents and eddies formed by any irregularities in the passage for the fluid near the orifice plate and meter take off ducts tends to restrict or alter the amount of fluid passing the orifice for any certain specified drop in pressure across said orifice. Therefore, the construction which I have provided overcomes certain objections which have heretofore existed with the use of orifice fittings and accomplishes an improved result.

To determine the accurate positioning of the plug with the plug turned 90 degrees from the original line as described, a small hole 43 in the wall of the plug is adapted to register with a positioning socket 44 in the wall of the body A. Said socket is threaded to receive a protecting plug 45 when not used.

The plug is lubricated upon and lifted from its seat to produce free turning at all times and prevent sticking by the following construction. Situated in the stem 15 of the plug is a downward passage 45 terminating above the chamber within the plug and provided with a compressing screw 46 which when turned is adapted to compress stick grease or other lubricant placed in said passage, downwardly through a check valve 47 at the lower end of said passage into a lubricant feeding duct 48. Said duct 48 is connected with a pair of annular lubricating horizontal channels 49 and 50 near the upper and lower portions of the conical face of the plug and with intersecting longitudinal ducts 51 which lead downwardly into the plug lifting chamber 20 in the casing below the plug. By this means the seat between the plug B and body A is efficiently lubricated by compressed grease under pressure or other lubricant and the plug is lifted by hydraulic pressure created in chamber 20, thus making the plug proof against leaking and sticking and thoroughly lubricating the adjacent surfaces of the plug and body to facilitate turning.

In accordance with the patent statutes, I have described the principles of operation of my invention, together with the construction thereof which I now consider to represent the best embodiment thereof, but I desire to have it understood that the structure shown is only illustrative and that the invention can be carried out by other means and applied to uses other than those above set forth within the scope of the following claims.

Having described my invention, what I claim as new and desire to secure by Letters Patent is:

1. An orifice fitting, comprising, a body having a plug chamber, a pair of oppositely disposed main ingress and egress ports of substantially even diameter entering said chamber and a hand hold through said body entering said chamber at one side of the line of said ports, and a plug rotatively seated in said chamber in said body having a main transverse duct of substantially the same diameter as that of said ports and a transverse by-passage through said plug adapted to connect with said ports in another position when said plug is turned, said main transverse duct having an orifice between its ends adapted to gauge the flow of fluid therethrough and having solid walls on either side of said orifice and end edges adapted to meet and register with the end edges of said ports to form a uniform passage free from disturbing cavities before and behind said orifice and said main transverse duct being adapted to register with said hand hole to provide access to said orifice when said plug is turned and said by-passage registers with said ports.

2. An orifice fitting, comprising, a body having a plug chamber, a pair of oppositely disposed main ingress and egress ports of substantially even diameter entering said chamber and a hand hole through said body entering said chamber at one side of the line of said ports, a plug rotatively seated in said chamber in said body having a main transverse duct of substantially the same even diameter as that of said ports, and a transverse by-passage through said plug adapted to connect with said ports in another position when said plug is turned, said main transverse duct having a transverse annulus between its ends and an orifice plate detachably mounted on said annulus, and said main transverse duct having solid walls on either side of said orifice plate and end edges adapted to meet and register with the end edges of said ports to form a uniform passage before and behind said orifice plate free from disturbing cavities and said main transverse duct being adapted to register with said hand hole to provide access to said orifice plate when said plug is turned and said by-passage registers with said ports, and said body and plug having meter ducts in registration when the main transverse duct in said plug is in full registration with said ingress and egress ports and communicating with said main transverse duct in said plug in close proximity to one side of said orifice plate to transmit the drop in pressure across said orifice plate.

3. An orifice fitting, comprising, a body having a plug chamber, a pair of oppositely disposed main ingress and egress ports of substantially even diameter entering said chamber and a hand hole through said body entering said chamber at one side of the line of said ports, and a plug rotatively seated in said chamber in said body having a main transverse duct of substantially the same diameter as that of said ports and a transverse by-passage through said plug adapted to connect with said ports in another position when said plug is turned, said main transverse duct having an orifice between its ends adapted to gauge the flow of fluid therethrough and having solid walls on either side of said orifice and end edges adapted to meet and register with the end edges of said ports to form a uniform passage free from disturbing cavities before and behind said orifice and said main transverse duct being adapted to register with said hand hole to provide access to said orifice when said plug is turned and said by-passage registers with said ports, and said body and plug having bleeder ducts which are adapted to register when the main duct in said plug is in full registration with said hand hole to release fluid under pressure in said main duct.

4. An orifice fitting, comprising, a body having a plug chamber, a pair of oppositely disposed main ingress and egress ports of substantially even diameter entering said chamber and a hand hole through said body entering said chamber at one side of the line of said ports, a plug rotatively seated in said chamber in said body having a main transverse duct of substantially the same diameter as that of said ports, and a transverse by-passage through said plug adapted to connect with said ports in another position when said plug is turned, said main transverse duct having a transverse annulus between its ends and an orifice plate detachably mounted on said annulus, and said main transverse duct having solid walls on either side of said orifice plate and end edges adapted to meet and register with the end edges of said ports to form a uniform passage before and behind said orifice plate free from disturbing cavities and said main transverse duct being adapted to register with said hand hole to provide access to said orifice plate when said plug is turned and said by-passage registers with said ports, and said body and plug having a pair of small meter ducts on each side of said orifice plate, said meter ducts of each pair being in registration when the main transverse duct in said plug is in full registration with said ingress and egress ports and out of registration by a slight degree of turn of said plug and adapted to transmit drop in pressure across both sides of said orifice plate.

5. An orifice fitting, comprising, a body having a plug chamber, a pair of oppositely disposed main ingress and egress ports of substantially even diameter entering said chamber and a hand hole through said body entering said chamber at one side of the line of said ports, a plug rotatively seated in said chamber in said body having a main transverse duct of substantially the same diameter as that of said ports and a transverse by-passage through said plug adapted to connect with said ports in another position when said plug is turned, said main transverse duct having an orifice between its ends adapted to gauge the flow of fluid therethrough and having solid walls on either side of said orifice and end edges adapted to meet and register with the end edges of said ports to form a uniform passage free from disturbing cavities before and behind said orifice and said main transverse duct being adapted to register with said hand hole to provide access to said orifice when said plug is turned and said by-passage registers with said ports, said plug having an operating stem by which it may be rotated, a packing gland between said plug and body, lubricant distributing ducts disposed to conduct lubricant between the working surfaces of said plug and body and means for compressing and urging lubricant through said lubricant distributing ducts.

PAUL H. WILKINSON.